United States Patent [19]

Kane et al.

[11] Patent Number: 4,621,671

[45] Date of Patent: Nov. 11, 1986

[54] TIRE MOUNTING SYSTEM

[75] Inventors: John P. Kane, Sterling Heights; Daniel Cser, Detroit; Robert H. Dall, Ann Arbor, all of Mich.

[73] Assignees: Allied Automation Systems, Inc.; General Motors Corp., both of Detroit, Mich.

[21] Appl. No.: 652,272

[22] Filed: Sep. 20, 1984

[51] Int. Cl.$^4$ ............................................. B60C 25/00
[52] U.S. Cl. ..................................... 157/1.1; 157/1.24
[58] Field of Search .......................... 157/1.1, 1.17, 1.2, 157/1.24

[56] References Cited

U.S. PATENT DOCUMENTS

| | | | |
|---|---|---|---|
| 2,900,018 | 8/1959 | Harrison | 157/1.1 |
| 3,612,140 | 10/1971 | Malinski | 157/1.17 |
| 4,420,026 | 12/1983 | Goiseau | 157/1.24 |

Primary Examiner—James G. Smith
Attorney, Agent, or Firm—Basile, Weintraub & Hanlon

[57] ABSTRACT

An automatic tire mounting and inflation system for successively mounting the upper and lower beads of a tire to a wheel. The system includes a continuously driven conveyor having means for feeding wheels and tires thereon, mounting the tire to the wheel in two successive steps, inflating the wheel mounted tire and removing the same from the conveyor.

6 Claims, 4 Drawing Figures

TIRE MOUNTING SYSTEM

BACKGROUND OF THE INVENTION

I. Field of the Invention

The present invention relates to the high-production mounting and inflation of a tubeless tire to a wheel.

II. Description of the Prior Art

The seating and inflation of pneumatic tires on a high-production basis has necessitated the development of specialized equipment for this purpose, and various systems have been proposed to accomplish bead seating and inflation in a minimum of time and with a minimum of supervision and manual operation.

A typical tubeless tire system begins with a loader which places individual wheels in position on an indexing conveyor. Simultaneously, tires are processed through a soaper and pass through a loading device which positions the tires on the indexing conveyor properly located on top of the wheel and ready for mounting. The indexing conveyor then transports the tire and wheel through an automatic tire mounting station which will simultaneously position both beads of the tire between the rims of the wheel. The mounted tire is then transported to an automatic inflation station which will inflate the tire, whereupon the inflated tire and wheel assembly is checked and delivered to a final assembly line for assembly to a vehicle.

In the mounting of the pneumatic tires upon the wheels, the tire beads are simultaneously forced over one of the wheel rims. As the wheel rim is of such a size as to "spread" the beads as they are forced thereover, considerable abrasion occurs between the rim and the tire beads during mounting. This close engagement between the rim and the beads is necessitated by the dimensional relationship of the rim and the tire beads which, once the tire is mounted, must cooperate to form a complete and sealing relationship as is necessary with tubeless tires.

The simultaneously forcing of the tire beads over the wheel rim can damage the tires beads and adversely affect the sealing thereof with the wheel rim once mounting has been completed. This problem is greatly accentuated by modern-day tires wherein the tread width is considerably larger than prior tire designs, and the tire side walls are relatively smaller.

Part of the problem of damage to the tire beads has been overcome by the application of a lubricating liquid or soap to the tire beads to facilitate the movement thereof over the rim. High-production lubricators have been provided which have greatly facilitated the application of the soap to the tire beads and have overcome many of the aforementioned problems. An example of such a bead lubricator is disclosed in U.S. Pat. No. 3,658,152. Examples of prior art systems which mount both tire beads to the wheel simultaneously are disclosed in U.S. Pat. Nos. 3,461,938 and 3,978,903.

Examples of other tire mounting systems are disclosed in U.S. Pat. Nos. 2,661,053, 1,850,053 and 2,907,379. The aforementioned apparatuses, while performing satisfactorily, require periodic inspection to ensure that the system is operating in an optimum manner, otherwise damage to the tires may result when dual bead mounting occurs.

SUMMARY OF THE INVENTION

The present invention, which will be described subsequently in greater detail, comprises a system for the mounting of pneumatic tires upon wheels under high-production conditions wherein an intermittently driven conveyor receives individual wheels onto which are positioned tires that engage a suitably mounted roller adapted to force the lower bead of each tire between the rims of its associated wheel. Downstream of the single bead engagement of the tire to the wheel, means are provided for positioning the tire aslant of its associated wheel whereupon mounting means engage the wheel and force the upper bead of the tire between the rims of its associated wheel.

It is therefore an object of the present invention to provide an automatic, high-speed tire and wheel processing system which will mount the tire to a wheel, one bead at a time.

It is a further object of the present invention to provide an automatic tire and wheel processing system which will permit the high-production bead seating and inflation of a tire to a wheel but which minimizes the problems of damage to the side walls and treads of oversized tires, yet one which is adapted to mount varying sized tires to varying sized wheels.

Other objects, advantages and applications of the present invention will become apparent to those skilled in the art of systems for automatically mounting tires to wheels when the accompanying description of one example of the best mode contemplated for practicing the invention is read in conjunction with the accompanying drawings.

BRIEF DESCRIPTION OF THE DRAWINGS

The description herein refers to the accompanying drawings wherein like reference numerals refer to like parts throughout the several views, and wherein.

DESCRIPTION OF THE PREFERRED EMBODIMENT

Figure 1:
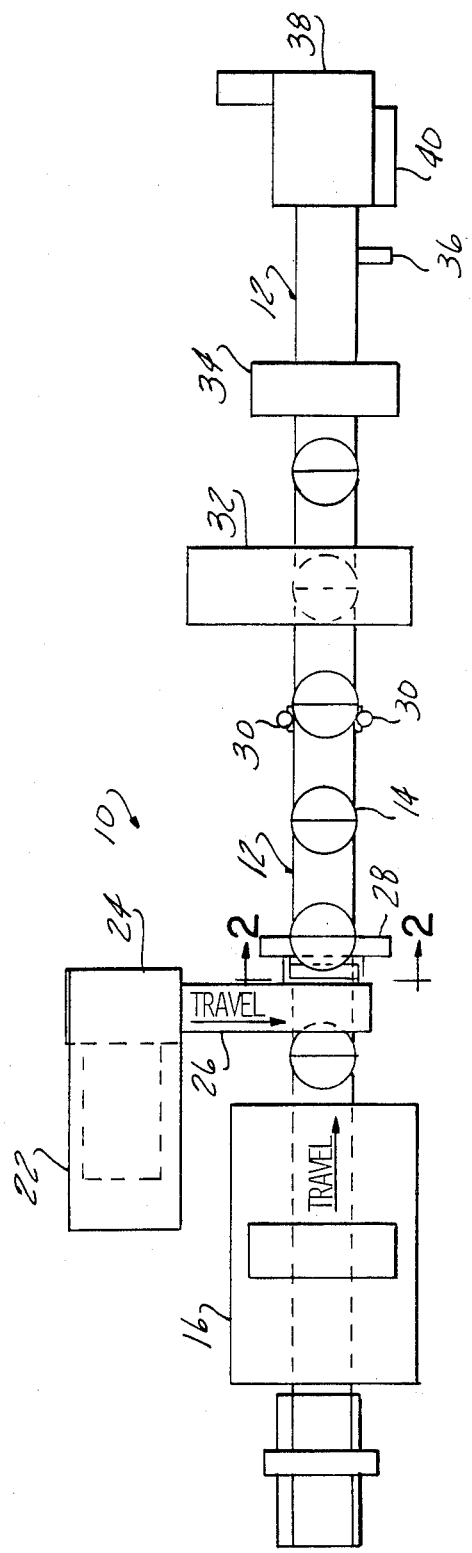
FIG. 1 is a schematic illustration of an automatic tire and wheel processing system constructed in accordance with the principles of the present invention.

Referring now to the drawings and, in particular, to FIG. 1, wherein there is illustrated in schematic form the basic relationship of the individual stages that comprise the tire mounting and inflating system 10. The system 10 comprises a pallet indexing conveyor 12 upon which a plurality of longitudinally spaced pallets 14 are carried. The tire mounting and inflation system 10 includes a wheel loader 16 which places individual wheels 18 (FIG. 4) in position on successive pallets 14 of the indexing conveyor 12. Simultaneously, tires 20 are conveyed by a belt conveyor 22 to a soaper 24 of the roll-on type wherein the tires 20 are processed and conveyed to a loading device 26 which places the tires 20 in the pallet indexing conveyor 12 properly positioned immediately in front of a wheel 18 and ready for the first step in the mounting process.

The indexing conveyor 12 moves the wheel 18 and tire 20 through a single bead mounting device 28, whereupon the lower bead of the tire 20 is forced between the rims of each wheel 18. The wheel and tire assembly is indexed to a tire lift cylinder assembly 30 wherein the tire 20 is aslant on its associated wheel 18, whereupon the tire 20 and wheel 18 are ready for final mounting. The indexing conveyor 12 then carries the tire 20 and wheel 18 through an automatic tire mounting station 32 wherein the upper bead of the tire 20 is forced between the rims of the wheel 18. Examples of tire bead lubricators and tire mounting machines are disclosed in U.S. Pat. Nos. 3,461,938, 2,665,747, 2,900,015 and 3,545,463.

The indexing conveyor 12 carries the tire and wheel assembly through an automatic inflation station 34 wherein the tire bead is seated and the tire 20 is inflated. An example of an apparatus for performing the aforementioned inflation is disclosed in U.S. Pat. No. 3,978,903.

The inflated tire and wheel assembly passes through an inflation check station 36 and to a tire and wheel unloader 38 wherein the inflated tire and wheel assembly is delivered to the final line for assembly to a vehicle. The pallet indexing conveyor 12 consists of pallets 14 mounted preferably on three-foot centers and designed specifically to receive the wheels to be carried through the various aforementioned stations. Preferably, the position of the pallet indexing conveyor 12 is controlled by appropriate cam limit switches and is driven through a hydrostatic drive 40 providing controlled acceleration and deceleration.

Figure 2:
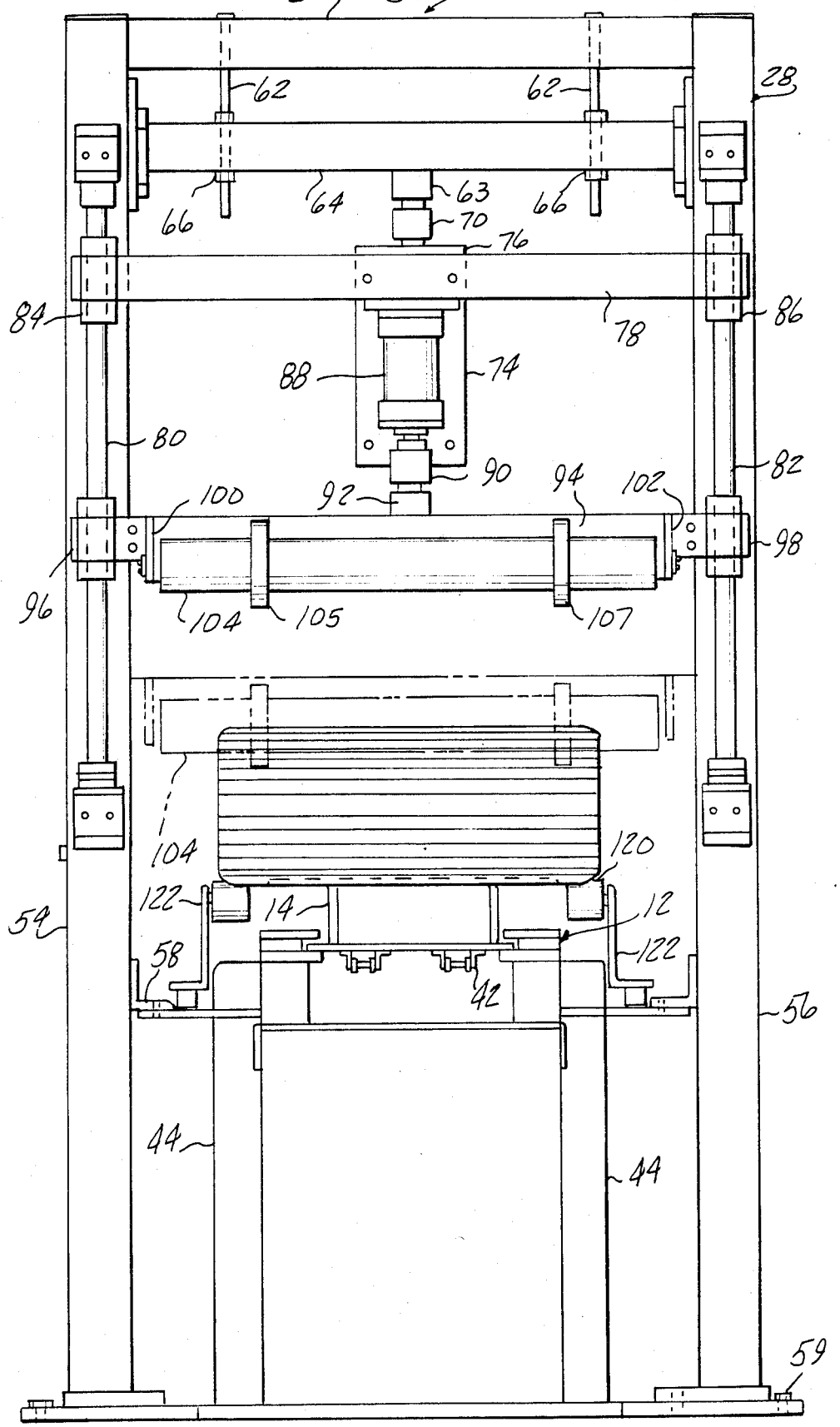
FIG. 2 is a cross-sectional view through the conveyor utilized in the processing system as seen from line 2—2 of FIG. 1.
Figure 3:
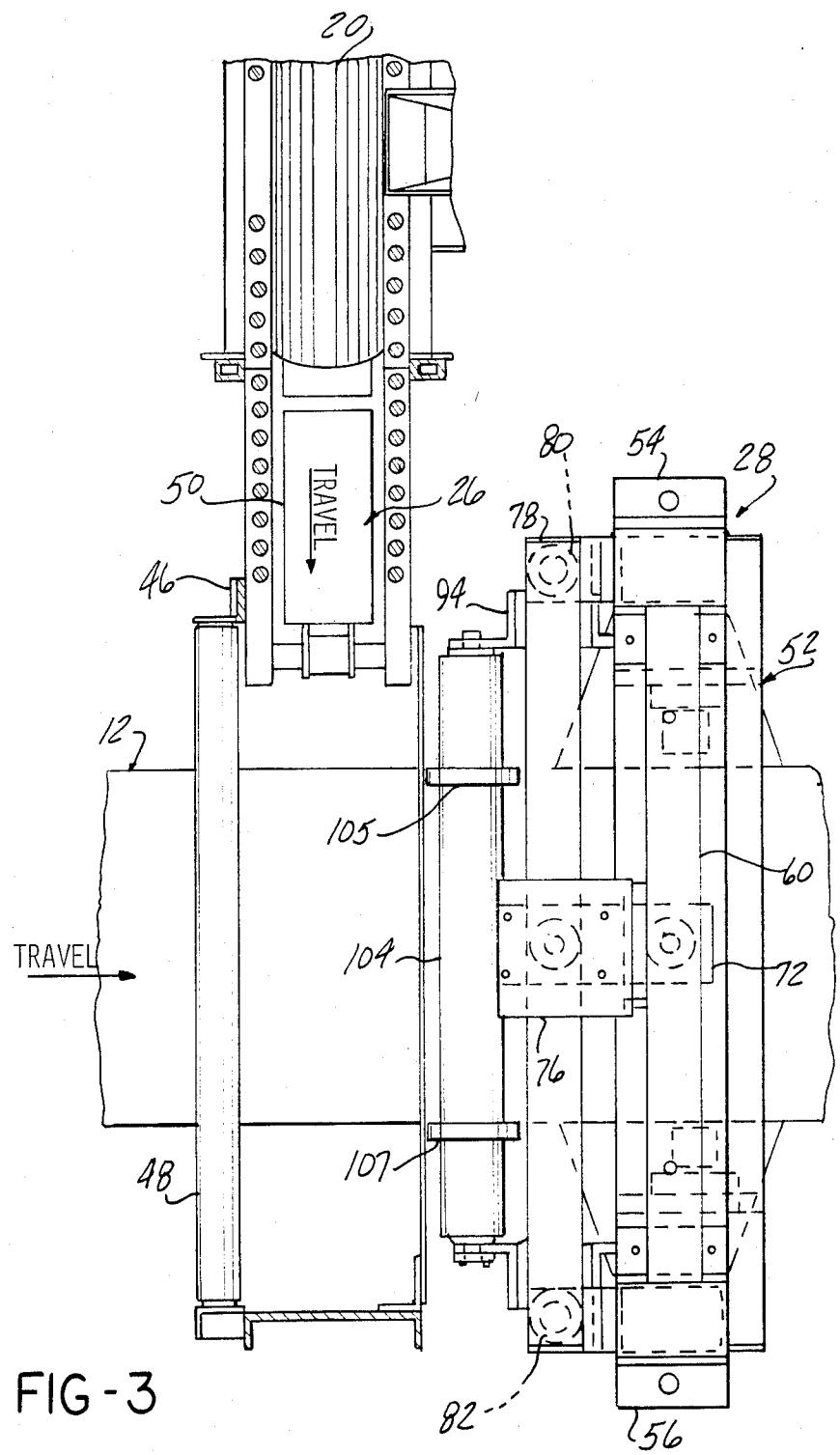
FIG. 3 is a top plan view of FIG. 2.
Figure 4:
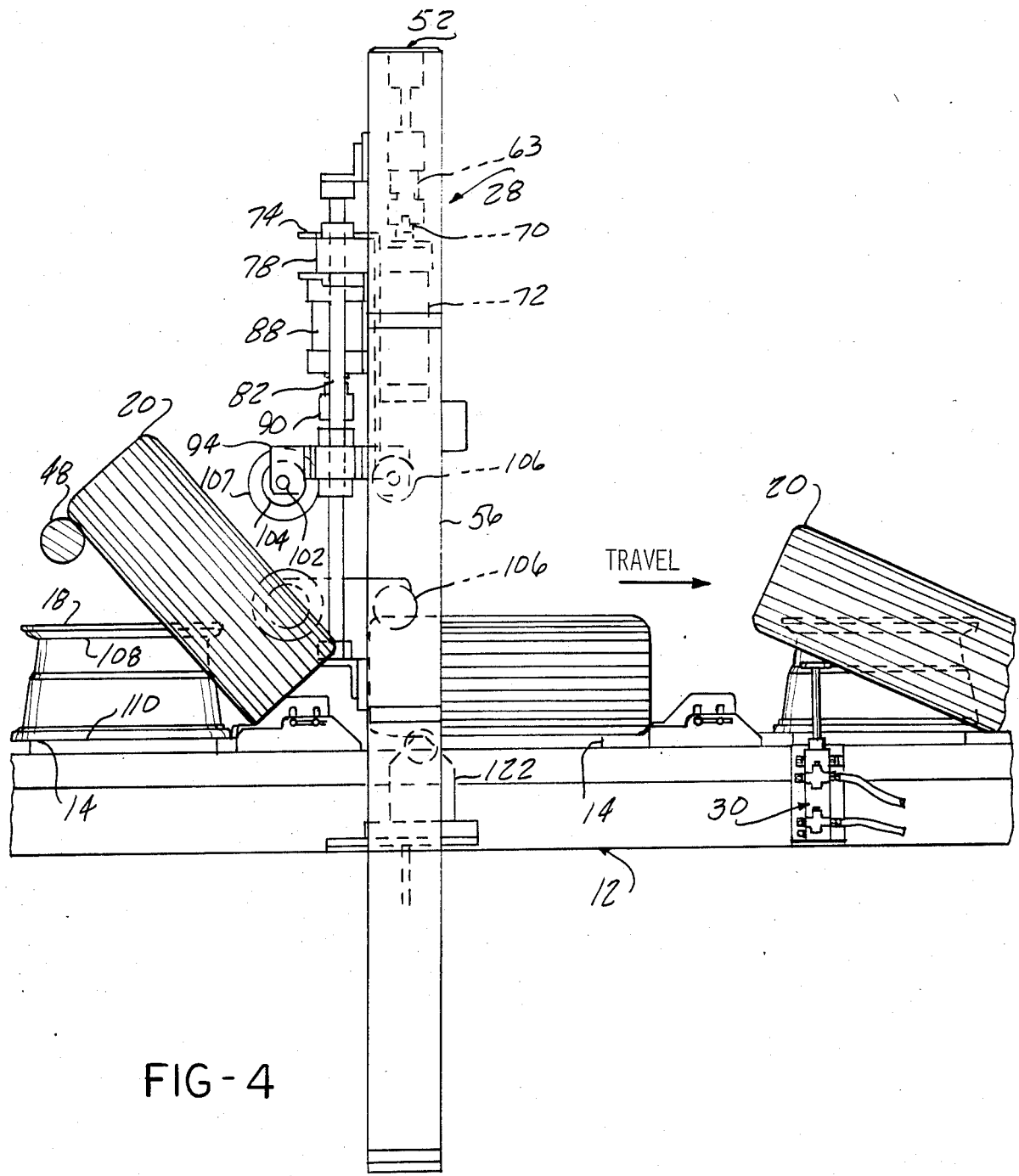
FIG. 4 is a right-side elevational view of FIG. 2.

Referring to FIGS. 2 and 4, it can be seen that the conveyor 12 comprises a plurality of separate pallets 14 mounted upon chains 42 or other conventional conveyor structure capable of moving in a horizontal direction between work stations. The hydrostatic drive 40 indexes the pallets 14 between successive work stations and the conveyor 12 includes lateral support structure 44 which houses the lower return portion (not shown) of the pallet conveyor 12. The details of operation of the conveyor form no part of the present invention and may be of a conventional construction. As can best be seen in FIGS. 3 and 4, the single bead mounting device 28 straddles the conveyor 12 in an upstream direction from the tire loading device 26. The tire loading device 26 includes a bridging framework 46 supporting a horizontal roller 48 disposed upstream from a loading shoe 50 of the tire loader 26 and located adjacent the conveyor 12 upon which the wheels 18 are conveyed and to which lubricated tires 20 are to be mounted, such that the conveyed wheels 18 located upon pallets 14 pass below the roller 48. Movement of the conveyor 12 and the pallets 14 is controlled in conjunction with the operation of the loader shoe 50 of the tire loading device 26, such that a lubricated tire 20 may be transferred from the loader shoe 50 to a pallet 14 containing a wheel 18. The manner in which the tire loader functions and the apparatus for controlling the same is described in the aforementioned U.S. Pat. No. 3,658,152, and a further description thereof is not necessary.

Referring now to FIGS. 2 and 4 for a detailed description of the inventive single bead mounting device 28, it can be seen that the same constitutes a U-shaped frame 52 which straddles the conveyor 12. The frame 52 includes vertical legs 54 and 56 which are secured through suitable fastening means 58 to the conveyor lateral support structure 42 and through fastening means 59 to the floor upon which the conveyor 12 is mounted. The upper ends of the legs 54 and 56 are connected by a cross beam 60 which in turn has a pair of fastening members 62 that extend downwardly and through a second cross member 64 and are secured there by suitable lug nuts 66 (FIG. 2). The bottom side of the cross member 64 is provided with a boss 63 to which a rod aligning coupler 70 is attached. The rod aligning coupler 70 is in turn attached to the extending end of a pneumatic cylinder 72 (see FIG. 4). The pneumatic cylinder 72 is in turn carried by an L-shaped support member 74 that has one of its legs 76 (see FIG. 3) fixedly secured to the top of a movable cross member 78. As can best be seen in FIG. 2, the upstream sides of the legs 54 and 56 fixedly support vertical shafts 80 and 82 which in turn slidably support sleeve members 84 and 86, respectively, attached to the opposite end portions of the movable cross member 78.

The lower surface of the movable cross member 78 carries a second air cylinder 88 fixedly secured thereto, the piston rod end of which extends downwardly and is coupled to a second rod aligning coupler 90 which in turn is secured to a boss 92 attached to the upper surface of a second movable cross member 94.

As can best be seen in FIG. 2, the movable cross member 94 has end sleeve members 96 and 98 which are slidably supported by the shafts 80 and 82 carried, respectively, by the upstream facing sides of the frame legs 54 and 56. The second movable cross member 94 has appending end flanges 100 and 102 which rotatably support movable bead rollers 104 and 106, respectively. The movable cross members 78 and 94 are connected to one another by the cylinder 90 in such a manner that the two movable cross members 78 and 94 normally move together as a unit. Upon actuation of the air cylinder 72 from its retracted position illustrated in FIG. 4 to an extended position, the movable members 78 and 94 and thus the bead rollers 104 and 106 are movable between the raised position illustrated in FIG. 4 to the lower position illustrated in phantom lines in FIG. 4 at 105. The extent of travel is approximately ten inches, but of course can vary dependent on the type and size of tires to be moved by the conveyor 12. When in the raised position, the roller 104 will cooperate with the roller 48 to simply lay the tire 20 aslant of the wheel 18 and will then function in the same manner as the rollers disclosed in the aforementioned U.S. Pat. No. 3,658,152. When the appropriate application requires the same, the air cylinder 72 is extended, lowering the rollers 104 and 106 to the position illustrated in phantom lines at 105 in FIG. 4. In this lowered position the rollers 104 and 106 cooperate with the upper surface of the tire 20 upon movement of the conveyor 12 and pallets 14, such that the rollers 104 and 106 force the lower bead of each tire 20 between the flanges 108 and 110 of the wheel 18 and the tire assumes the horizontal position shown in the intermediate section of FIG. 4. The lower tire bead of the tire 20 is secured between the wheel flanges 108 and 110 without any damage to the tire 20. If desired, the rollers 104 and 106 may be provided with annular roller extensions 105 and 107, respectively, which will engage the tire 20 outside of the wheel flanges 108 and 110 and permit the application of a greater pressure on the tire 20 while not engaging the wheel 18.

The second air cylinder 88 preferably is provided with a two-inch stroke and is adapted to move the lower cross member 94 and its associated bead rollers 104 and 106 independently of the upper cross members 64 and 78. This permits the rollers 104 and 106 to be adjusted to a selected distance above the pallet 14 and thus upper surface of the wheel 18 so as to accommodate the passage therethrough of tires and wheels of varying sizes.

The device 28 is further provided with a pair of lower rollers 120 supported on either side of the conveyor pallets 14 by means of bracket 122. The rollers 120 are positioned to be approximately ½ inch higher than the lower flange 110 of the wheel 18 and function to engage the tire 20 to ensure that the same is positioned horizontally, as indicated in FIG. 4.

As can best be seen in FIG. 4 and as described hereinbefore, the conveyor 12 is provided with tire lift cylinders 30 which are actuated in response to the proper positioning of a wheel and tire assembly so as to raise the upstream side of the tire 20 to a position such that the tire is aslant with respect to the wheel 18, whereby it may be received in an appropriate automatic tire mounting station 32 and the upper bead of the tire 20 is then forced between the rims 108 and 110 of the wheel 18, such as described in the aforementioned patents, such as U.S. Pat. No. 2,665,747.

As aforementioned, the tire wheel assembly is then conveyed by the conveyor 12 to the automatic inflation station 34 wherein the tire 20 is inflated.

It can thus be seen that the present invention has provided a new and improved tire mounting and inflation system wherein a tire may be mounted to a wheel in a high-speed, automated system without damage to the tire.

It should be understood by those skilled in the art of tire mounting and inflation systems that other forms of the invention may be had, all coming within the spirit of the invention and scope of the appended claims.

What is claimed is as follows:

1. An automatic tire mounting system comprising:
    a conveyor;
    a first feed means for placing a wheel having a pair of fixedly spaced rim flanges in a flat position on said conveyor for movement therewith;
    a second feed means situated downstream from said first feed means for positioning a tire on said conveyor in an upright position immediately in front of said wheel;
    roller means downstream of said second feed means for positioning said tire aslant before said rim and forcing the lower bead only of said tire between the rim flanges of said wheel as said tire and wheel are advanced by said conveyor past said roller means;
    positioning means downstream of said roller means for placing said tire in a rearwardly aslant position on said wheel while maintianing the lower bead between said rim flanges;
    mounting means downstream of said positioning means adapted to automatically force the upper bead of said tire between the rim flanges of said wheel as said tire and wheel are conveyed past said mounting means; and
    inflation means for inflating the tire on said wheel.

2. The automatic tire mounting system defined in claim 1 wherein said roller means comprises a roller positioning means for positioning said roller above said conveyor at a predetermined lower distance to engage the upper surface of said tire and force said tire lower bead between said flanges of said wheel.

3. The automatic tire mounting system defined in claim 2 wherein said positioning means is selectively operable to locate said roller in a first position wherein said roller is elevated at a predetermined upper distance and adapted to engage said tire to tilt said tire to said rearwardly aslant position, and a second position at said predetermined lower distance above said conveyor for engaging said tire and forcing said lower bead between said wheel flanges.

4. The automatic tire mounting system defined in claim 3 further comprising means for adjusting the position of said roller when in said second position so as to change the position of said roller to accommodate tires of varying sizes.

5. The automatic tire mounting system defined in claim 4 wherein said frame member straddles said conveyor, said frame member having on an upstream side thereof, and comprising:
    a pair of shafts;
    a first cross member slidably supported by said shafts, said first cross members supporting said roller;
    a second cross member disposed above said first cross member and slidably supported by said shafts;
    first cylinder means disposed between said first and second cross members to move the lower member relative to the upper member to provide for said adjustment in the position of said rollers with respect to said tire; and
    second cylinder means connecting said upper member to said frame so as to move said upper member and thus said lower rollers therewith to move said rollers between said first and second positions.

6. The method of automatically mounting a tire to a wheel, comprising:
    feeding wheels one after another flat on a conveyor;
    feeding tires immediately in front of each wheel as each wheel passes a predetermined location;
    forcing the lower bead only of the tire between the rim flanges of each wheel as they pass downstream of said predetermined location;
    positioning the tire aslant of the wheel with said lower bead between said rim flanges;
    forcing the upper bead of the tire between the rim flanges of the wheel; and
    inflating the tire on the wheel.

* * * * *

UNITED STATES PATENT OFFICE
CERTIFICATE OF CORRECTION

Patent No. 4,621,671      Dated Nov. 11, 1986

Inventor(s) John P. Kane, et al

It is certified that error appears in the above-identified patent and that said Letters Patent are hereby corrected as shown below:

Column 3, line 39, delete "an upstream" and insert --a downstream--

Column 4, line 28, delete "cylinder" and insert --coupler--.

Column 4, line 35, delete "at 105" and insert --.--.

Column 4, line 45, delete "at 105".

Column 5, line 51, delete "maintianing" and insert --maintaining--

Signed and Sealed this

Seventeenth Day of March, 1987

Attest:

DONALD J. QUIGG

Attesting Officer      Commissioner of Patents and Trademarks